(12) United States Patent
Keam (10) Patent No.: US 6,496,185 B1
(45) Date of Patent: Dec. 17, 2002

(54) METHOD AND APPARATUS FOR PROCESSING A MESH OF TRIANGLES

(75) Inventor: Nigel S. Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/345,596

(22) Filed: Jun. 29, 1999

(51) Int. Cl.⁷ .............................................. G06T 15/00
(52) U.S. Cl. ..................................................... 345/419
(58) Field of Search ................................ 345/420, 423, 345/581, 582, 583, 584, 585, 419

(56) References Cited

U.S. PATENT DOCUMENTS 5,561,749 A 10/1996 Schroeder ................... 395/120
6,314,205 B1 * 11/2001 Masuda et al. ............. 382/232

* cited by examiner

Primary Examiner—Phu K. Nguyen

(74) Attorney, Agent, or Firm—Lee & Hayes, PLLC (57) ABSTRACT

A processing system processes a mesh of triangles represented by a triangle list. A list optimization module rearranges the triangles in the triangle list such that triangle indices for adjacent triangles are stored as sequential entries in the triangle list. For each triangle in the triangle list, a triangle processing module determines whether a current triangle can be treated as a continuation of an current triangle strip. If the current triangle can be treated as a continuation of the current triangle strip, then a single vertex is added to the current triangle strip. The single vertex added to the current triangle strip is the vertex of the current triangle that is not already contained in the current triangle strip. If the current triangle cannot be treated as a continuation of the current triangle strip, then the current triangle strip terminated. After terminating the current triangle strip, a new triangle strip is created starting with the current triangle. All three vertices of the new triangle are processed at the start of the new triangle strip. The processing system determines whether the current triangle can be treated as a continuation of the current triangle strip by comparing a specific pair of triangle indices of the current triangle to a specific pair of triangle indices of the previous triangle.

68 Claims, 5 Drawing Sheets

(Prior Art)

Triangle 1:   ( 0, 1, 2 )
                     odd-to-even comparison  (match)
Triangle 2:   ( 1, 3, 2 )
                     even-to-odd comparison  (match)
Triangle 3:   ( 2, 3, 4 )
                     odd-to-even comparison  (No match)
Triangle 4:   ( 5, 6, 7 )
                     odd-to-even comparison  (match)
Triangle 5:   ( 6, 8, 7 )

Fig. 7

METHOD AND APPARATUS FOR PROCESSING A MESH OF TRIANGLES

TECHNICAL FIELD

This invention relates to image processing. More particularly, the invention relates to a system and method of processing a list of triangles that represent a surface of a three-dimensional object image.

BACKGROUND OF THE INVENTION

Image processing systems are capable of converting graphical object data into an image that is viewed by a user or observer of the image processing system. Graphical object data may be stored in a variety of different formats, including various compressed formats. The type of data format used to store the graphical object data varies depending on the type of image processing system that receives and processes the data, the type of image being produced (e.g., two-dimensional or three-dimensional), and the type of equipment used to generate and store the graphical object data.

In three-dimensional graphics applications, graphical objects are typically defined, processed, and provided to the rendering hardware as a series of adjoining triangles. Each triangle is defined by three points or vertices. Because the triangles adjoin each other, a single point might be a vertex of several different triangles.

Each point or vertex of each triangle may have various associated information, such as location coordinates (i.e., coordinates in the x, y, and z directions), ambient color, reflective color, texture coordinates, fogging and alpha blending components, etc. Since each vertex may have a significant amount of associated data, operations such as moving, storing, and reading vertices can become a significant part of the image rendering process.

Figure 1:
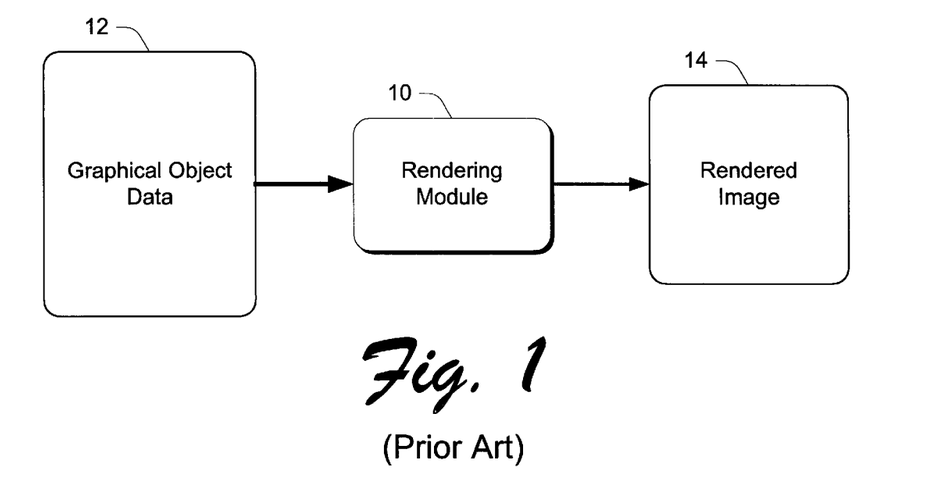
FIG. 1 illustrates an exemplary rendering module that receives graphical object data and generates a rendered image.

FIG. 1 illustrates an exemplary rendering module 10 that receives graphical object data and generates a rendered image. Rendering module 10 receives graphical object data 12 from a data source. The rendering module 10 processes the graphical object data 12 and generates a rendered image 14. The rendered image 14 can be displayed on a computer monitor or other display device or may be transmitted to another location for display.

Figure 2A:
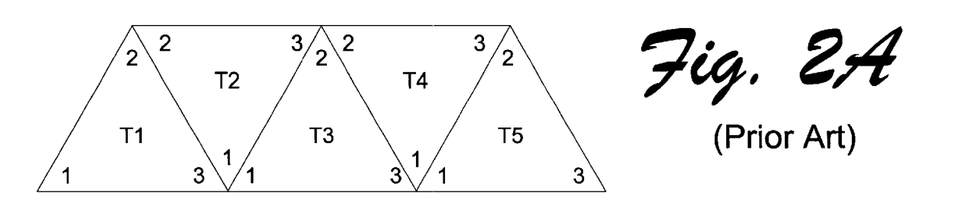
FIG. 2A illustrates a series of five triangles, labeled T1–T5.

FIG. 2A illustrates a series of five triangles, labeled T1–T5. Each triangle has three vertices, labeled "1", "2", and "3". Adjacent triangles share vertices with one another. For example, triangles T1 and T2 share two vertices—vertex 2 of triangle T1 is shared with vertex 2 of triangle T2 and vertex 3 of triangle T1 is shared with vertex 1 of triangle T2.

A series of triangles, such as the series shown in FIG. 2A, can be represented in several formats: a non-indexed list, a non-indexed strip, an indexed list, and an indexed strip. A non-indexed list identifies three separate vertices for each triangle in the series. For example, in the series of triangles shown in FIG. 2A, a non-indexed list is represented as:

T1: T1V1, T1V2, T1V3
T2: T2V1, T2V2, T2V3
T3: T3V1, T3V2, T3V3
T4: T4V1, T4V2, T4V3
T5: T5V1, T5V2, T5V3

Where, for example, T1V1 defines vertex "1" of triangle T1 and T1V2 is vertex "2" of triangle T1. Each entry in the list (T1V1, T1V2, etc.) represents a triangle vertex and has associated information, as discussed above (i.e., screen coordinates, color, etc.). This non-indexed list requires three separate vertex entries to define each triangle. Further, the non-indexed list does not consider the common relationships between certain vertices (e.g., in FIG. 2A, T1V2 is the same vertex as T2V2, and T1V3 is the same vertex as T2V1). Thus, when processing the non-indexed list, the system will process both vertices T1V2 and T2V2, even though they are the same vertex. This results in unnecessary vertex processing, which reduces the performance of the image processing system. However, the list format is advantageous in that a single list is able to store an entire mesh of triangles (discussed below).

Figure 2B:
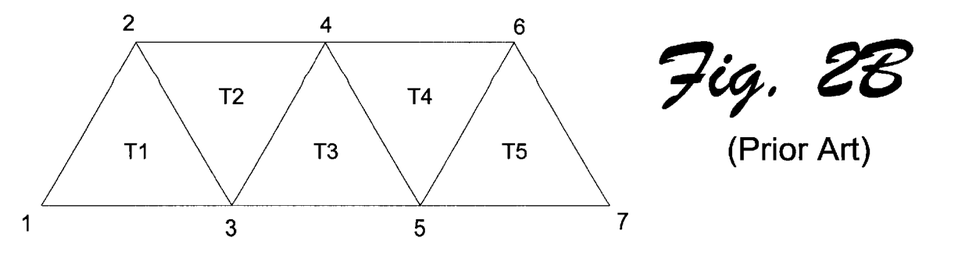
FIG. 2B illustrates the same five triangles illustrated in FIG. 2A, but each of the seven vertices has a single identifier (labeled 1–7).

In a non-indexed strip of triangles, a list of vertices represents a single triangle strip. Each vertex in the non-indexed strip (starting with the third vertex) defines a triangle along with the two previous vertices. FIG. 2B illustrates the same five triangles illustrated in FIG. 2A, but each of the seven vertices has a single identifier (labeled 1–7). The five triangles in FIG. 2B can be represented by the following triangle strip:

V1, V2, V3, V4, V5, V6, V7 where V1 through V7 each define a single vertex. This triangle strip represents triangles (V1, V2, V3), (V3, V2, V4), (V3, V4, V5), (V5, V4, V6), and (V5, V6, V7). A strip of triangles is an efficient way to represent a series of adjacent triangles. However, the triangle strip format cannot generally represent an entire mesh of triangles as a single strip. Instead, multiple strips are required to represent the triangle mesh. Each time the strip reaches a triangle with no other adjoining triangle, the current strip terminates and a new strip is started.

Using an indexed list notation, a list of three indices is associated with each triangle and a pool of vertices is referred to by the indices. For example, using an indexed list to identify the five triangles in FIG. 2B, the indexed list is represented as:

V1, V2, V3, V4, V5, V6, V7
and the associated indices:
i1, i2, i3
i3, i2, i4
i3, i4, i5
i5, i4, i6
i5, i6, i7

In this notation, "V1" defines a first vertex and the indices "i1 i2, i3" define the first triangle as having vertices V1, V2, and V3. The indexed list vertices can be processed once into a separate buffer so that the indexed accesses can read pre-processed vertices. Using this process, each distinct vertex is processed exactly once. Another advantage of the indexed list is its reduction in storage size (an index is very small (e.g., two bytes) compared to a vertex (e.g., 32 bytes).

Finally, an indexed strip of triangles identifies a strip of indices and a pool of vertices referred to by the indices. For example, using an indexed strip to represent the five triangles in FIG. 2B produces a sequence of vertices:

V1, V2, V3, V4, V5, V6, V7
and associated indices:
i1, i2, i3, i4, i5, i6, i7

Using this notation, "V1" defines a first vertex of a triangle in the strip and the first three indices "i1, i2, i3" define the first triangle in the strip. The indexed strip of triangles provides a simplified notation for representing triangle strips.

Figure 3:
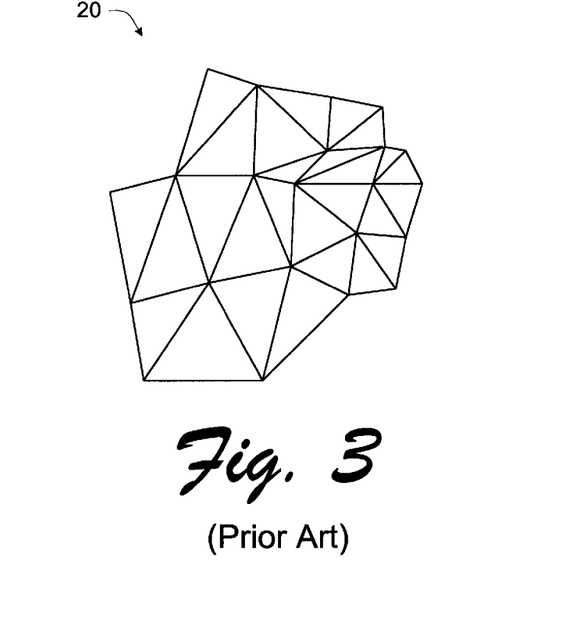
FIG. 3 illustrates an example mesh of triangles.

FIG. 3 illustrates an example mesh of triangles 20 (also referred to as a "triangle mesh"). In a typical mesh of triangles, each vertex is usually shared by six triangles. Rather than processing the same vertex six times (once for each triangle associated with the vertex), known techniques simplify the processing by: (1) processing the mesh of triangles using indices to refer to vertices in a pool of unique vertices so that each vertex only needs to be transformed (or processed) once, and (2) if a sequence of adjacent triangles exists (such as a mesh), treating the sequence as a "triangle strip" instead of a "triangle list." Using the second technique, the first triangle is defined by three vertices. All subsequent triangles are defined by a single new vertex and the last two vertices of the previous triangle in the strip. These two techniques can be used separately or together so that existing graphics systems can handle the following combinations: Non-Indexed List, Non-Indexed Strip, Indexed List, and Indexed Strip.

Using these known techniques, many vertices are processed only once for all associated triangles, rather than repeatedly processing the same vertex for different associated triangles. Thus, many existing systems attempt to process triangles in strips instead of individual triangle lists. However, in many situations, it is easier to define and maintain the triangles in a triangle list format instead of a strip format. For example, a mesh may include physically disconnected groups of triangles that otherwise share similar features (such as similar texture). These triangles can be grouped together in a list but cannot be connected as a strip because the triangles are not physically adjacent to one another (a requirement to form a strip of triangles). Additionally, it is generally difficult to define an entire mesh of triangles as a single strip. The shape of the mesh may prevent creation of a single strip or may require the insertion of "dummy" triangles to convert the mesh into a single strip.

The image processing begins when an application passes the graphical object data 12 (FIG. 1) to the rendering module 10 through an interface method. The available interface methods expect to receive data in one of the formats discussed above. Another problem associated with the use of triangle strips is caused by existing application programming interfaces (APIs) that can only process a single strip of triangles in one function call to the rendering module 10. Thus, a mesh that could be represented as a single list of triangles is instead passed through the API as multiple triangle strips, each of which incurs a function call overhead.

SUMMARY OF THE INVENTION

The invention provides an improved mechanism for converting a mesh of triangles represented as a list of triangles into one or more strips of triangles. Graphical object data (in triangle list format) is provided to a list optimization module, which rearranges the list of triangles to improve the generation of triangle strips from the triangle list. After rearranging the list of triangles, the list optimization module provides the rearranged list to a triangle processing module. The triangle processing module converts the list of triangles to multiple triangle strips. The multiple triangle strips are then processed by a rendering module to generate an image.

The invention described herein is capable of representing an entire triangle mesh as a single triangle list. The triangle list format, which provides for easier data manipulation, is maintained for most of the processing. However, the list optimization module rearranges the triangles in the indexed list and reorients the triangle indices by rotating the indices, as necessary, to optimize the processing of the indexed list of triangles. Specifically, the triangles are rearranged in adjacent strips even though they continue to be listed and stored in a non-strip format. The triangles are then provided to a triangle processing module in an indexed list, non-strip format, through the use of a single function call. The triangle processing module then converts the indexed triangle list into one or more triangle strips, which is made possible by the previous re-ordering of the listed triangles. Using this method, the benefits of strip processing can be obtained without incurring the overhead of multiple function calls. The triangle strips are easier to process by the rendering module or other rendering hardware due to the reduced number of vertices that require processing (as a result of the sharing of vertices between adjacent triangles). The rendering module uses the strips of triangles to generate an image on a display device, such as a computer monitor or a television.

In a particular implementation of the invention, the single vertex added to the current triangle strip is the vertex of the current triangle that is not already contained in the current triangle strip.

In another implementation of the invention, after terminating the current triangle strip, a new triangle strip is created starting with the current triangle. All three vertices of the new triangle are processed at the start of the new triangle strip.

In one embodiment of the invention, the triangle processing module determines whether the current triangle can be treated as a continuation of the current triangle strip by comparing a specific pair of triangle indices of the current triangle to a specific pair of triangle indices of the previous triangle. If the previous triangle in the current triangle strip is an odd triangle and the current triangle is an even triangle, and if the second index of the previous triangle matches the first index of the current triangle and the third index of the previous triangle matches the third index of the current triangle, then the current triangle is added to the current triangle strip. If the previous triangle in the current triangle strip is an even triangle and the current triangle is an odd triangle, and if the second index of the previous triangle matches the second index of the current triangle and the third index of the previous triangle matches the first index of the current triangle, then adding the current triangle to the current triangle strip.

DETAILED DESCRIPTION

The present invention provides a processing mechanism that converts a list of triangles into one or more strips of triangles. The processing mechanism is capable of processing a mesh containing disconnected triangles or a group of awkwardly arranged triangles. The mesh of triangles may represent one or more three-dimensional objects. A single function call converts the entire mesh of triangles from a list format to one or more strips of triangles, thereby reducing function call overhead. The invention processes the entire triangle mesh as a single triangle list, even if multiple triangle strips are required to represent the mesh. Processing the mesh as a triangle list until late in the process increases the speed of the triangle processing. Additionally, by maintaining the triangle list, the arrangement and orientation of the triangles in the list can be optimized to improve the creation of triangle strips.

Figure 4:
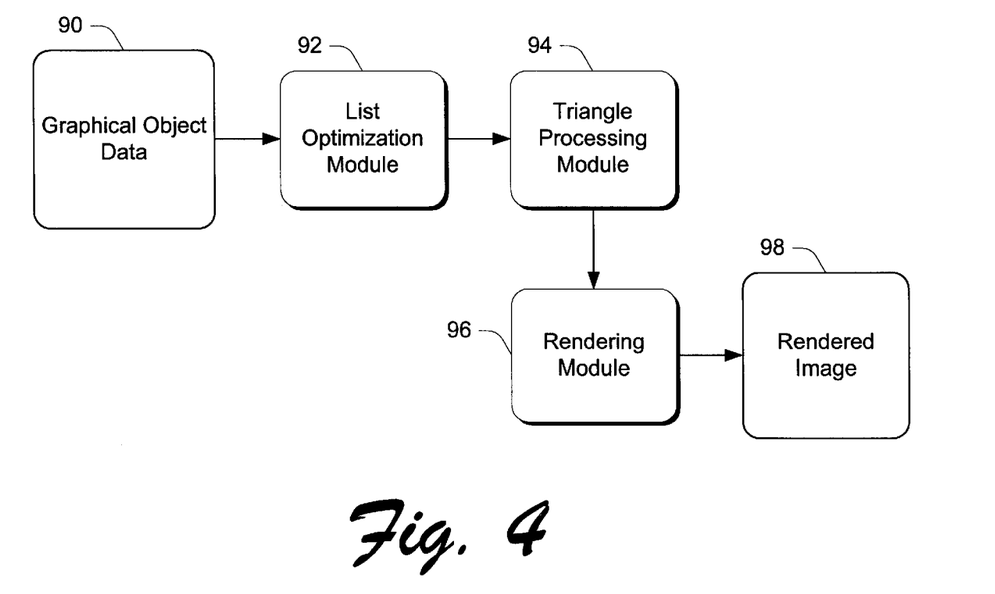
FIG. 4 illustrates an exemplary image processing system including a list optimization module and a triangle processing module.

FIG. 4 illustrates an exemplary image processing system. A list optimization module 92 receives graphical object data 90 in the form of an indexed triangle list. The object data 90 may be received from a storage mechanism such as a disk drive, CD-ROM, video game cartridge, or other data storage system. The list optimization module 92 rearranges the triangles in the list and reorients the triangle indices by rotating the indices, as necessary, to optimize the processing of the list of triangles. Specifically, the triangles are rearranged into adjacent strips even though they continue to be listed and stored in a non-strip format (i.e., a triangle list format). Typically, this optimization is performed during the content-creation phase of manufacturing. Since the optimizing process is typically slow, performing the process as part of the manufacturing of a product is acceptable because an image is not being rendered during the manufacturing process. Thus, pre-optimized lists of triangles are stored on a CD, videotape, game cartridge, etc. Additional details regarding the rearranging and rotating of entries in the triangle list are provided below with respect to FIG. 5.

The optimized triangle list is then provided to a triangle processing module 94, through the use of a single function call, for example. The triangle processing module 94 processes the optimized triangle list to generate one or more triangle strips using the procedures described herein. Since the triangle list is already optimized, the triangle processing module 94 can quickly generate triangle strips. The triangle strips are communicated from the triangle processing module 94 to a rendering module 96, which converts the triangle strips into a rendered image 98. The rendered image 98 can be displayed on a computer monitor, a television, or other display device. Additionally, the rendered image data may be stored on a storage device (not shown) for later display of the rendered image 98. Although FIG. 4 illustrates several separate modules, any two or more modules may be combined together in a single module. For example, the triangle processing module 94 and the rendering module 96 may be combined together into a single processing/rendering module.

The modules 92, 94, and 96 shown in FIG. 4 can be located at different geographic sites. For example, the list optimization module 92 may be located at a development site where the graphical object data 90 is generated. In this example, the triangle processing module 94 is located at another site that processes the optimized triangle list (received from the list optimization module 92) and renders image 98 using rendering module 96. In another example, the list optimization module 92 and the triangle processing module 94 are located at the same site, which performs both the triangle optimization and the conversion of the triangle list to one or more triangle strips. The triangle strips may be stored (e.g., on a game cartridge or other distribution media) and transported to an end user having an appropriate rendering module 96 (e.g., a game console, general purpose computer, or other image rendering system).

Figure 5:
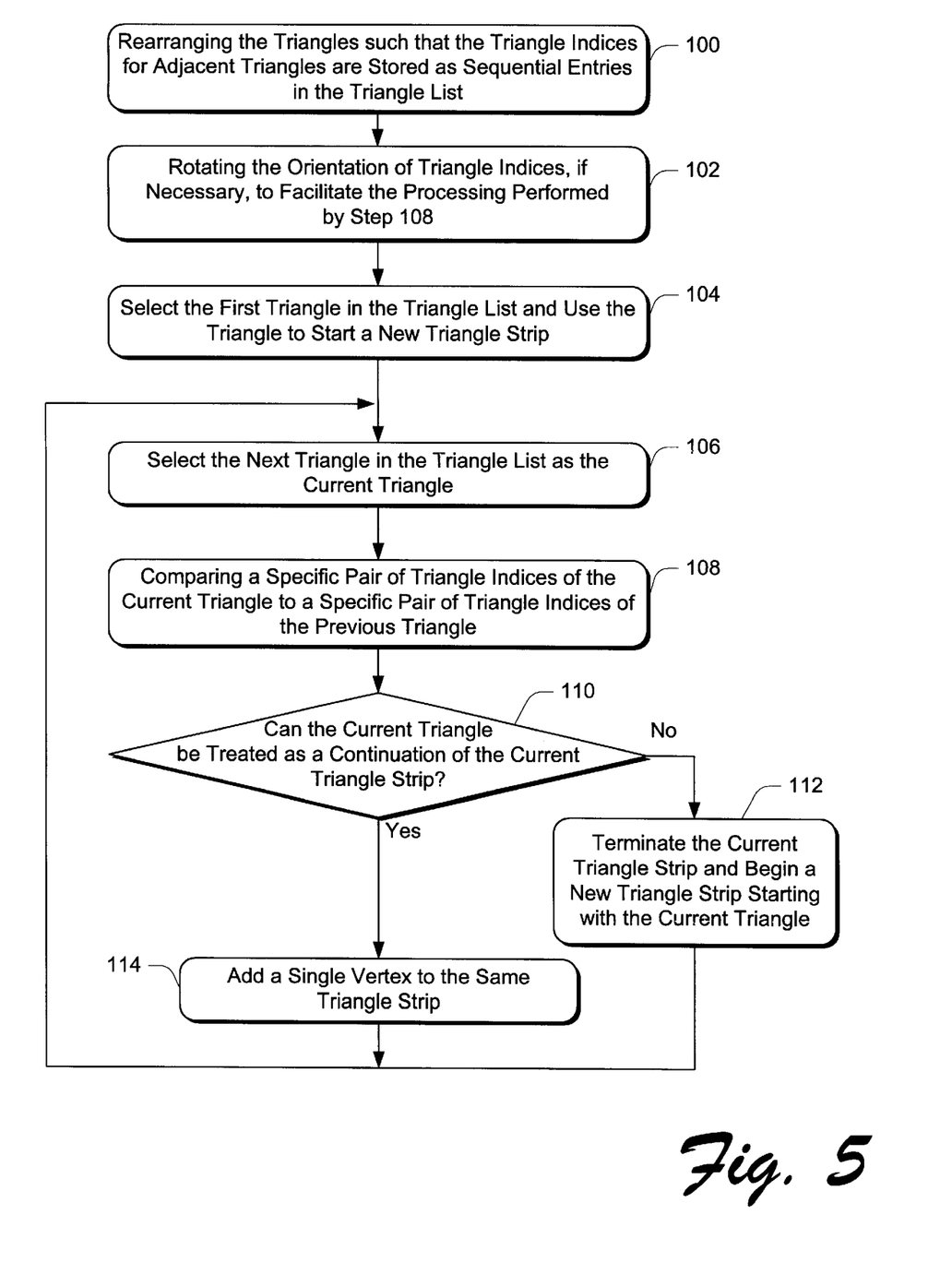
FIG. 5 is a flow diagram illustrating an exemplary procedure for converting a mesh represented by a list of triangles into one or more strips of triangles.

FIG. 5 is a flow diagram illustrating an exemplary procedure for converting a mesh represented by a list of triangles into one or more strips of triangles. FIG. 5 illustrates both optimization steps as well as list-to-strip conversion steps in a single flow diagram. However, as discussed above, the steps may be performed by different modules (e.g., the list optimization module 92 and the triangle processing module 94) and be performed at different locations and at different times.

Step 100 rearranges the list of triangles such that the triangle indices for adjacent triangles in the mesh are stored as sequential entries in the triangle list. This rearrangement of triangle data improves the mesh processing by optimizing the triangle data to generate longer triangle strips. At step 102, the procedure rotates the orientation of triangle indices, if necessary, to improve the processing performed by step 108. Additional details retarding the rotation of triangle indices are provided below after discussing the processing performed by step 108.

Step 104 selects the first triangle in the triangle list and uses that triangle to start the first triangle strip. Since this is the first triangle in the strip, all three vertices of the triangle are processed. At step 106, the next triangle in the triangle list is selected as the current triangle. Step 108 compares a specific pair of triangle indices of the current triangle to a specific pair of triangle indices of the previous triangle. Additional details regarding the comparison of specific pairs of triangle indices are provided below with respect to FIG. 6 and FIG. 7.

Step 110 determines whether the current triangle can be treated as a continuation of the current strip. If the specific pairs of triangle indices compared in step 108 are identical, then the current triangle can be treated as a continuation of the current strip. In this situation, the procedure continues to step 114 to add a single vertex (from the current triangle) to the current triangle strip. Thus, only the single vertex of the current triangle requires processing instead of all three vertices of the current triangle. If the specific pairs of triangle indices compared in step 108 do not match, then step 110 branches to step 112, which terminates the current triangle strip and begins a new triangle strip starting with the current triangle. In this case, all three vertices of the current triangle require processing because all three vertices are new to the triangle strip. The procedure then returns from step 112 or step 114 to step 106 to select the next triangle in the triangle list. When all triangles have been processed, the procedure terminates. At this point, the original mesh of triangles (represented as a triangle list) has been converted to one or more triangle strips that can be communicated to a rendering module or similar hardware to generate the image represented by the triangle strip(s).

Figure 6:
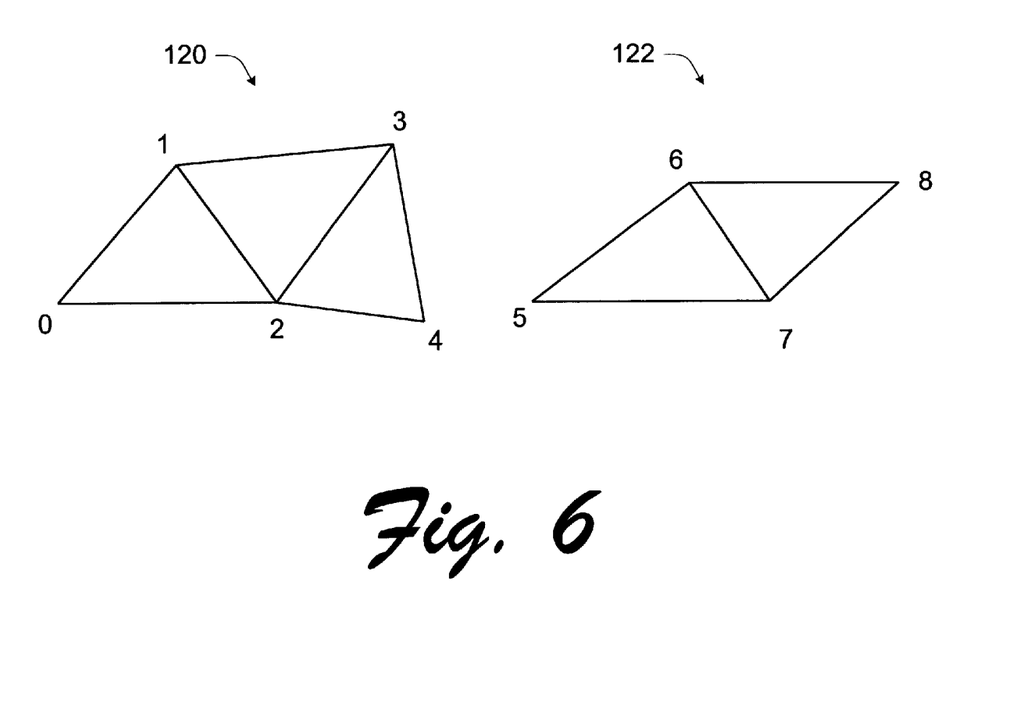
FIG. 6 illustrates a mesh containing disconnected triangles.

FIG. 6 illustrates a mesh containing two groups of disconnected triangles 120 and 122. The mesh of FIG. 6 will be used as an example to illustrate the process described above with respect to FIG. 5. The mesh of FIG. 6 can be represented in various formats. For example, the mesh can be represented as an unoptimized triangle list:

(0,1,2) (2,3,4) (1,3,2) (5,6,7) (7,6,8)

Note that the list is unoptimized because triangle (1,3,2) is not adjacent to triangle (0,1,2). To optimize the above triangle list, the entries in the list are rearranged such that the triangle indices for adjacent triangles are stored as sequential entries in the triangle list (step 100, FIG. 5). The optimized triangle list can be represented as:

(0,1,2) (1,3,2) (2,3,4) (5,6,7) (7,6,8)

In the optimized triangle list above, triangle (1,3,2) has been moved such that it is adjacent to both triangles (0,1,2) and (2,3,4), as shown in FIG. 6.

The fifth triangle in the optimized triangle list, triangle (7,6,8), can also be represented as (6,8,7) or (8,7,6) by rotating the vertices. To further optimize the above triangle list, the orientation of the fifth triangle is rotated to (6,8,7) (step 102, FIG. 5) to align the vertices in a manner that facilitates the processing performed by step 108 of FIG. 5. After rotating the fifth triangle, the optimized triangle list can be represented as:

(0,1,2) (1,3,2) (2,3,4) (5,6,7) (6,8,7)

Figure 7:
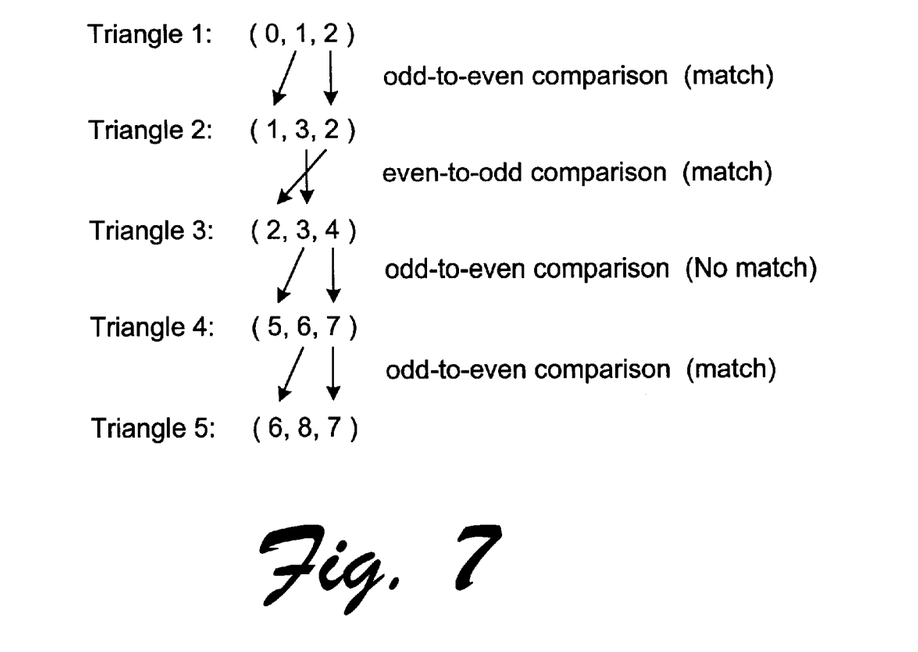
FIG. 7 illustrates comparing a specific pair of indices of the current triangle to a specific pair of indices of the previous triangle to determine whether the current triangle can be treated as a continuation of the current triangle strip.

FIG. 7 illustrates an example of the operation of step 108 of FIG. 5; i.e., comparing a specific pair of triangle indices of the current triangle to a specific pair of triangle indices of the previous triangle to determine whether the current triangle can be treated as a continuation of the current triangle strip. The indices that are compared vary depending on whether the current triangle and the previous triangle are odd or even numbered triangles in the current triangle strip.

If the previous triangle is an odd triangle (e.g., the first, third, fifth, etc. triangle in the strip) and the current triangle is an even triangle (e.g., the second, fourth, sixth, etc. triangle in the strip), then two comparisons occur: (1) the second index of the previous triangle is compared to the first index of the current triangle, and (2) the third index of the previous triangle is compared to the third index of the current triangle. If both comparisons generate a match, then the current triangle can be treated as a continuation of the current triangle strip. If either comparison does not generate a match, then the current triangle strip is terminated and a new triangle strip is created starting with the current triangle.

If the previous triangle in the triangle strip is an even triangle and the current triangle is an odd triangle, then a different two comparisons occur: (1) the second index of the previous triangle is compared to the second index of the current triangle, and (2) the third index of the previous triangle is compared to the first index of the current triangle. If both comparisons generate a match, then the current triangle can be treated as a continuation of the current triangle strip. If either comparison does not generate a match, then the current triangle strip is terminated and a new triangle strip is created starting with the current triangle.

Referring to FIG. 7, triangle (0,1,2) is the first triangle (an odd triangle) in the triangle strip and, therefore, all three vertices 0, 1, and 2 require processing. The current triangle (1,3,2) is an even triangle in the triangle strip. The two triangles (0,1,2) and (1,3,2) are compared using the appropriate comparison discussed above, and as illustrated by the arrows between the indices. In this situation, the two comparisons match, indicating that the current triangle (1,3,2) can be added to the current triangle strip. Since vertices 1 and 2 have already been processed (as part of triangle (0,1,2)), only vertex 3 of the current triangle requires processing.

The next triangle (2,3,4) (an odd triangle) is then compared to the previous triangle (1,3,2) (an even triangle) using the appropriate comparison of indices, as shown by the arrows between the indices in FIG. 7. In this example, both comparisons match, indicating that triangle (2,3,4) can be added to the current triangle strip, thereby requiring processing of only vertex 4. The next triangle (5,6,7) (an even triangle) is compared to the previous triangle (2,3,4) (an odd triangle) using the appropriate comparison of indices, as shown by the arrows in FIG. 7. In this situation, the comparison fails because neither comparison generates a match. Thus, the triangle (5,6,7) cannot be added to the current triangle strip. Instead, the previous strip is terminated and triangle (5,6,7) is the first triangle in a new triangle strip. Since triangle (5,6,7) is the first triangle in a new triangle strip, it is an odd triangle (even though it was treated as an even triangle in the previous comparison). Since triangle (5,6,7) is the first triangle in the triangle strip, all three vertices 5, 6, and 7 require processing.

Finally, the last triangle (6,8,7) (an even triangle) is compared to the previous triangle (5,6,7) (an odd triangle) using the appropriate comparison, as shown in FIG. 7. In this example, the two comparisons match, indicating that triangle (6,8,7) can be added to the current triangle strip, thereby requiring processing of only vertex 8. This completes the processing of the triangle list into two strips of triangles. Although the example shown in FIG. 6 and FIG. 7 only contains five triangles, a typical mesh of triangles may contain thousands of triangles that are processed into several triangle strips.

Referring back to step 102 of FIG. 5, the triangle indices are rotated, if necessary, to facilitate the comparison performed in step 108. Thus, step 102 looks at each adjacent pair of triangles to determine whether rotating the indices of one or both of the triangles will cause a match when the appropriate comparison is performed in step 108. Rotating the triangle indices to cause a match lengthens the triangle strip, which improves the mesh processing and typically reduces the number of triangle strips required to represent the mesh.

FIG. 7, discussed above, illustrates one example of the comparisons of a specific pair of triangle indices of the current triangle to a specific pair of triangle indices of the previous triangle to determine whether the current triangle can be treated as a continuation of the current triangle strip. Several other similar comparisons can be used to determine whether the current triangle can be treated as a continuation of the current triangle strip. These additional comparisons are performed in the same manner as discussed above, but involve different indices of the triangles. The comparisons discussed above can be represented with the following notation:

Odd-Even (2,3)-(1,3)
Even-Odd (2,3)-(2,1)

This notation indicates that when the previous triangle is odd and the current triangle is even, the second index of the previous triangle is compared to the first index of the current triangle, and the third index of the previous triangle is compared to the third index of the current triangle. Similarly, if the previous triangle is even and the current triangle is odd, the second index of the previous triangle is compared to the second index of the current triangle, and the third index of the previous triangle is compared to the first index of the current triangle.

The additional eight comparisons that can be used to determine whether the current triangle can be treated as a continuation of the current triangle strip are listed using the same notation:

1. Odd-Even (2,3)-(2,1) Even-Odd (3,1)-(2,1)
2. Odd-Even (2,3)-(3,2) Even-Odd (1,2)-(2,1)
3. Odd-Even (3,1)-(1,3) Even-Odd (2,3)-(3,2)
4. Odd-Even (3,1)-(2,1) Even-Odd (3,1)-(3,2)
5. Odd-Even (3,1)-(3,2) Even-Odd (1,2)-(3,2)

6. Odd-Even (1,2)-(1,3) Even-Odd (2,3)-(1,3)
7. Odd-Even (1,2)-(2,1) Even-Odd (3,1)-(1,3)
8. Odd-Even (1,2)-(3,2) Even-Odd (1,2)-(1,3)

Thus, a total of nine different comparisons can be used to determine whether the current triangle can be treated as a continuation of the current triangle strip.

Figure 8:
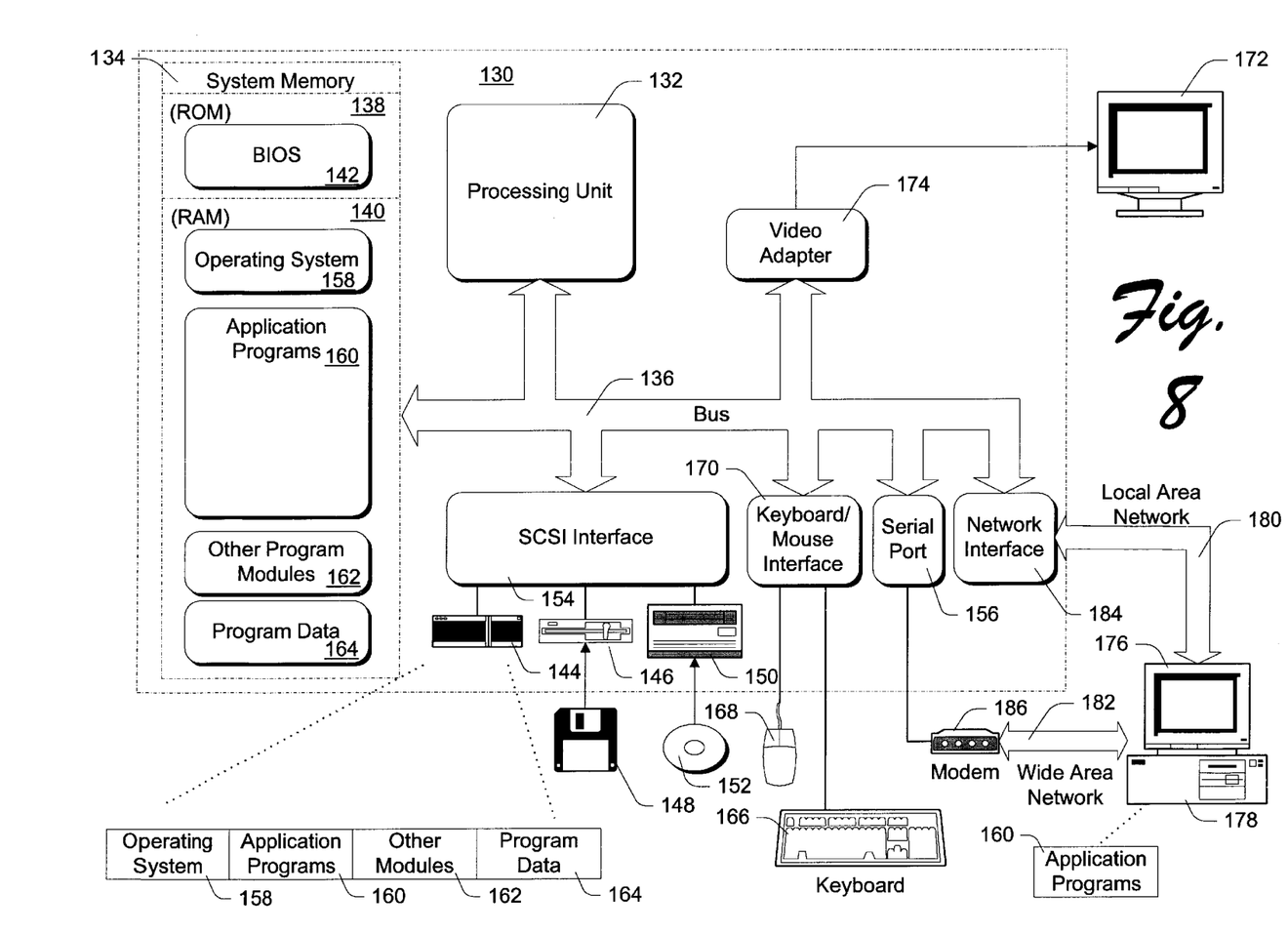
FIG. 8 shows a general example of a computer 130 that can be used in accordance with the invention.

FIG. 8 shows a general example of a computer 130 that can be used in accordance with the invention. Computer 130 may be used to perform any or all of the various processing steps described herein. Further, computer 130 is capable of rendering an image from the triangle strips generated as a result of the triangle processing steps. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 8. The logical connections depicted in FIG. 8 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

In an alternate embodiment of the invention, the various processing steps described herein are performed by a game console or other video gaming device. The data representing the triangle mesh may be stored in the video gaming device or on a removable card or cartridge which contains the program code for the game. If the data representing the triangle mesh is stored on a separate cartridge, the data is processed by the game console when the cartridge is installed into the game console and the program stored on the cartridge is executed.

As described above, the invention provides a system and method for processing a triangle list, which represents a mesh of triangles, into one or more triangle strips. The triangle strips are then processed by a rendering module or other hardware to generate an image represented by the triangle strips. Thus, the invention takes advantage of both triangle lists and triangle strips. The triangle list is optimized before converting the triangle list to one or more triangle strips. This optimization improves the generation of triangle strips by arranging the triangle data into adjacent strips, even though the triangle data remains in triangle list format. A single function call causes conversion of the entire triangle list into one or more triangle strips, which are efficiently processed by the rendering module to generate an image.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of processing a mesh of triangles represented by a triangle list, the method comprising:

rearranging the triangles such that triangle indices for adjacent triangles are stored as sequential entries in the triangle list;

for each triangle in the triangle list, determining whether a current triangle can be treated as a continuation of a current triangle strip;

if the current triangle can be treated as a continuation of the current triangle strip, then adding a single vertex to the current triangle strip;

if the current triangle cannot be treated as a continuation of the current triangle strip, then terminating the current triangle strip.

2. A method as recited in claim 1, wherein the single vertex added to the current triangle strip is the vertex of the current triangle that is not already contained in the current triangle strip.

3. A method as recited in claim 1, further including:

rotating the orientation of the triangle indices, if necessary, to facilitate processing of the mesh of triangles.

4. A method as recited in claim 1, wherein the mesh of triangles represent at least one three-dimensional object.

5. A method as recited in claim 1, further comprising passing the triangle list to a triangle processing module in a single function call.

6. A method as recited in claim 1, wherein the step of terminating the current triangle strip further comprises creating a new triangle strip starting with the current triangle.

7. A method as recited in claim 1, wherein the step of terminating the current triangle strip further comprises:

creating a new triangle strip starting with the current triangle; and processing all three vertices associated with the current triangle.

8. A method as recited in claim 1, wherein the step of adding a single vertex to the current triangle strip further comprises processing the single vertex.

9. A method as recited in claim 1, wherein the step of determining whether the current triangle can be treated as a continuation of the current triangle strip comprises comparing a specific pair of triangle indices of the current triangle to a specific pair of triangle indices of the previous triangle.

10. A method as recited in claim 1, wherein the step of determining whether the current triangle can be treated as a continuation of the current triangle strip further comprises:

if the previous triangle in the current triangle strip is an odd triangle and the current triangle is an even triangle, and if the second index of the previous triangle matches the first index of the current triangle and the third index of the previous triangle matches the third index of the current triangle, then adding the current triangle to the current triangle strip;

if the previous triangle in the current triangle strip is an even triangle and the current triangle is an odd triangle, and if the second index of the previous triangle matches the second index of the current triangle and the third index of the previous triangle matches the first index of the current triangle, then adding the current triangle to the current triangle strip.

11. A method as recited in claim 1, wherein the step of determining whether the current triangle can be treated as a continuation of the current triangle strip further comprises:

if the previous triangle in the current triangle strip is an odd triangle and the current triangle is an even triangle, and if the second index of the previous triangle matches the second index of the current triangle and the third index of the previous triangle matches the first index of the current triangle, then adding the current triangle to the current triangle strip;

if the previous triangle in the current triangle strip is an even triangle and the current triangle is an odd triangle, and if the third index of the previous triangle matches the second index of the current triangle and the first index of the previous triangle matches the first index of the current triangle, then adding the current triangle to the current triangle strip.

12. A method as recited in claim 1, wherein the step of determining whether the current triangle can be treated as a continuation of the current triangle strip further comprises:

if the previous triangle in the current triangle strip is an odd triangle and the current triangle is an even triangle, and if the second index of the previous triangle matches the third index of the current triangle and the third index of the previous triangle matches the second index of the current triangle, then adding the current triangle to the current triangle strip;

if the previous triangle in the current triangle strip is an even triangle and the current triangle is an odd triangle, and if the first index of the previous triangle matches the second index of the current triangle and the second index of the previous triangle matches the first index of the current triangle, then adding the current triangle to the current triangle strip.

13. A method as recited in claim 1, wherein the step of determining whether the current triangle can be treated as a continuation of the current triangle strip further comprises:

if the previous triangle in the current triangle strip is an odd triangle and the current triangle is an even triangle, and if the third index of the previous triangle matches the first index of the current triangle and the first index of the previous triangle matches the third index of the current triangle, then adding the current triangle to the current triangle strip;

if the previous triangle in the current triangle strip is an even triangle and the current triangle is an odd triangle, and if the second index of the previous triangle matches the third index of the current triangle and the third index of the previous triangle matches the second index of the current triangle, then adding the current triangle to the current triangle strip.

14. A method as recited in claim 1, wherein the step of determining whether the current triangle can be treated as a continuation of the current triangle strip further comprises:

if the previous triangle in the current triangle strip is an odd triangle and the current triangle is an even triangle, and if the third index of the previous triangle matches the second index of the current triangle and the first index of the previous triangle matches the first index of the current triangle, then adding the current triangle to the current triangle strip;

if the previous triangle in the current triangle strip is an even triangle and the current triangle is an odd triangle, and if the third index of the previous triangle matches the third index of the current triangle and the first index of the previous triangle matches the second index of the current triangle, then adding the current triangle to the current triangle strip.

15. A method as recited in claim 1, wherein the step of determining whether the current triangle can be treated as a continuation of the current triangle strip further comprises:

if the previous triangle in the current triangle strip is an odd triangle and the current triangle is an even triangle, and if the third index of the previous triangle matches the third index of the current triangle and the first index of the previous triangle matches the second index of the current triangle, then adding the current triangle to the current triangle strip;

if the previous triangle in the current triangle strip is an even triangle and the current triangle is an odd triangle, and if the first index of the previous triangle matches the third index of the current triangle and the second index of the previous triangle matches the second index of the current triangle, then adding the current triangle to the current triangle strip.

16. A method as recited in claim 1, wherein the step of determining whether the current triangle can be treated as a continuation of the current triangle strip further comprises:

if the previous triangle in the current triangle strip is an odd triangle and the current triangle is an even triangle, and if the first index of the previous triangle matches the first index of the current triangle and the second index of the previous triangle matches the third index of the current triangle, then adding the current triangle to the current triangle strip;

if the previous triangle in the current triangle strip is an even triangle and the current triangle is an odd triangle, and if the second index of the previous triangle matches the first index of the current triangle and the third index of the previous triangle matches the third index of the current triangle, then adding the current triangle to the current triangle strip.

17. A method as recited in claim 1, wherein the step of determining whether the current triangle can be treated as a continuation of the current triangle strip further comprises:

if the previous triangle in the current triangle strip is an odd triangle and the current triangle is an even triangle, and if the first index of the previous triangle matches the second index of the current triangle and the second index of the previous triangle matches the first index of the current triangle, then adding the current triangle to the current triangle strip;

if the previous triangle in the current triangle strip is an even triangle and the current triangle is an odd triangle, and if the third index of the previous triangle matches the first index of the current triangle and the first index of the previous triangle matches the third index of the current triangle, then adding the current triangle to the current triangle strip.

18. A method as recited in claim 1, wherein the step of determining whether the current triangle can be treated as a continuation of the current triangle strip further comprises:

if the previous triangle in the current triangle strip is an odd triangle and the current triangle is an even triangle, and if the first index of the previous triangle matches the third index of the current triangle and the second index of the previous triangle matches the second index of the current triangle, then adding the current triangle to the current triangle strip;

if the previous triangle in the current triangle strip is an even triangle and the current triangle is an odd triangle, and if the first index of the previous triangle matches the first index of the current triangle and the second index of the previous triangle matches the third index of the current triangle, then adding the current triangle to the current triangle strip.

19. A method as recited in claim 1, wherein the method generates at least one triangle strip.

20. A method as recited in claim 1, wherein the triangle list is an indexed triangle list.

21. A method as recited in claim 1, further comprising: communicating all triangle strips to a rendering module for display on a display device.

22. One or more computer-readable memories containing a computer program that is executable by a processor to perform the method recited in claim 1.

23. A method of processing a mesh of triangles represented by an optimized triangle list to generate at least one triangle strip, the method comprising:

for each triangle in the optimized triangle list, determining whether a current triangle can be treated as a continuation of an current triangle strip;

if the current triangle can be treated as a continuation of the current triangle strip, then adding a single vertex to the same triangle strip;

if the current triangle cannot be treated as a continuation of the current triangle strip, then terminating the current triangle strip and beginning a new triangle strip with the current triangle.

24. A method as recited in claim 23, further comprising: rearranging the triangles in the triangle list such that the triangle indices for adjacent triangles as stored as sequential entries in the triangle list.

25. A method as recited in claim 23, wherein the single vertex added to the current triangle strip is the vertex of the current triangle that is not already contained in the current triangle strip.

26. A method as recited in claim 23, wherein the mesh of triangles represent at least one three-dimensional object.

27. A method as recited in claim 23, further comprising calling a single function once to process the entire mesh of triangles.

28. A method as recited in claim 23, wherein the step of adding a single vertex to the current triangle strip further comprises processing the single vertex.

29. A method as recited in claim 23, wherein the step of determining whether the current triangle can be treated as a continuation of the current triangle strip comprises comparing a specific pair of triangle indices of the current triangle to a specific pair of triangle indices of the previous triangle.

30. A method as recited in claim 23, wherein the step of determining whether the current triangle can be treated as a continuation of the current triangle strip further comprises:

if the previous triangle in the current triangle strip is an odd triangle and the current triangle is an even triangle, and if the second index of the previous triangle matches the first index of the current triangle and the third index of the previous triangle matches the third index of the current triangle, then adding the current triangle to the current triangle strip;

if the previous triangle in the current triangle strip is an even triangle and the current triangle is an odd triangle, and if the second index of the previous triangle matches the second index of the current triangle and the third index of the previous triangle matches the first index of the current triangle, then adding the current triangle to the current triangle strip.

31. A method as recited in claim 23, wherein the step of determining whether the current triangle can be treated as a continuation of the current triangle strip further comprises:
if the previous triangle in the current triangle strip is an odd triangle and the current triangle is an even triangle, and if the second index of the previous triangle matches the second index of the current triangle and the third index of the previous triangle matches the first index of the current triangle, then adding the current triangle to the current triangle strip;
if the previous triangle in the current triangle strip is an even triangle and the current triangle is an odd triangle, and if the third index of the previous triangle matches the second index of the current triangle and the first index of the previous triangle matches the first index of the current triangle, then adding the current triangle to the current triangle strip.

32. A method as recited in claim 23, wherein the step of determining whether the current triangle can be treated as a continuation of the current triangle strip further comprises:
if the previous triangle in the current triangle strip is an odd triangle and the current triangle is an even triangle, and if the second index of the previous triangle matches the third index of the current triangle and the third index of the previous triangle matches the second index of the current triangle, then adding the current triangle to the current triangle strip;
if the previous triangle in the current triangle strip is an even triangle and the current triangle is an odd triangle, and if the first index of the previous triangle matches the second index of the current triangle and the second index of the previous triangle matches the first index of the current triangle, then adding the current triangle to the current triangle strip.

33. A method as recited in claim 23, wherein the step of determining whether the current triangle can be treated as a continuation of the current triangle strip further comprises:
if the previous triangle in the current triangle strip is an odd triangle and the current triangle is an even triangle, and if the third index of the previous triangle matches the first index of the current triangle and the first index of the previous triangle matches the third index of the current triangle, then adding the current triangle to the current triangle strip;
if the previous triangle in the current triangle strip is an even triangle and the current triangle is an odd triangle, and if the second index of the previous triangle matches the third index of the current triangle and the third index of the previous triangle matches the second index of the current triangle, then adding the current triangle to the current triangle strip.

34. A method as recited in claim 23, wherein the step of determining whether the current triangle can be treated as a continuation of the current triangle strip further comprises:
if the previous triangle in the current triangle strip is an odd triangle and the current triangle is an even triangle, and if the third index of the previous triangle matches the second index of the current triangle and the first index of the previous triangle matches the first index of the current triangle, then adding the current triangle to the current triangle strip;
if the previous triangle in the current triangle strip is an even triangle and the current triangle is an odd triangle, and if the third index of the previous triangle matches the third index of the current triangle and the first index of the previous triangle matches the second index of the current triangle, then adding the current triangle to the current triangle strip.

35. A method as recited in claim 23, wherein the step of determining whether the current triangle can be treated as a continuation of the current triangle strip further comprises:
if the previous triangle in the current triangle strip is an odd triangle and the current triangle is an even triangle, and if the third index of the previous triangle matches the third index of the current triangle and the first index of the previous triangle matches the second index of the current triangle, then adding the current triangle to the current triangle strip;
if the previous triangle in the current triangle strip is an even triangle and the current triangle is an odd triangle, and if the first index of the previous triangle matches the third index of the current triangle and the second index of the previous triangle matches the second index of the current triangle, then adding the current triangle to the current triangle strip.

36. A method as recited in claim 23, wherein the step of determining whether the current triangle can be treated as a continuation of the current triangle strip further comprises:
if the previous triangle in the current triangle strip is an odd triangle and the current triangle is an even triangle, and if the first index of the previous triangle matches the first index of the current triangle and the second index of the previous triangle matches the third index of the current triangle, then adding the current triangle to the current triangle strip;
if the previous triangle in the current triangle strip is an even triangle and the current triangle is an odd triangle, and if the second index of the previous triangle matches the first index of the current triangle and the third index of the previous triangle matches the third index of the current triangle, then adding the current triangle to the current triangle strip.

37. A method as recited in claim 23, wherein the step of determining whether the current triangle can be treated as a continuation of the current triangle strip further comprises:
if the previous triangle in the current triangle strip is an odd triangle and the current triangle is an even triangle, and if the first index of the previous triangle matches the second index of the current triangle and the second index of the previous triangle matches the first index of the current triangle, then adding the current triangle to the current triangle strip;
if the previous triangle in the current triangle strip is an even triangle and the current triangle is an odd triangle, and if the third index of the previous triangle matches the first index of the current triangle and the first index of the previous triangle matches the third index of the current triangle, then adding the current triangle to the current triangle strip.

38. A method as recited in claim 23, wherein the step of determining whether the current triangle can be treated as a continuation of the current triangle strip further comprises:
if the previous triangle in the current triangle strip is an odd triangle and the current triangle is an even triangle, and if the first index of the previous triangle matches the third index of the current triangle and the second index of the previous triangle matches the second index of the current triangle, then adding the current triangle to the current triangle strip;
if the previous triangle in the current triangle strip is an even triangle and the current triangle is an odd triangle, and if the first index of the previous triangle matches the first index of the current triangle and the second index of the previous triangle matches the third index of the current triangle, then adding the current triangle to the current triangle strip.

39. A method as recited in claim 23, wherein the triangle list is an indexed triangle list.

40. A method as recited in claim 23, further comprising:
communicating all triangle strips to a rendering module for display on a display device.

41. One or more computer-readable memories containing a computer program that is executable by a processor to perform the method recited in claim 23.

42. One or more computer-readable media having stored thereon a computer program comprising the following steps:
determining whether a current triangle can be treated as a continuation of an current triangle strip;
if the current triangle can be treated as a continuation of the current triangle strip, then adding a single vertex to the current triangle strip;
if the current triangle cannot be treated as a continuation of the current triangle strip, then terminating the current triangle strip and beginning a new triangle strip with the current triangle.

43. One or more computer-readable media as recited in claim 42 further comprising:
rotating the orientation of triangle indices, if necessary, to facilitate processing of the mesh of triangles.

44. One or more computer-readable media as recited in claim 42, wherein the current triangle is part of a mesh of triangles that represents at least one three-dimensional object.

45. One or more computer-readable media as recited in claim 42, wherein the step of adding a single vertex to the current triangle strip further comprises processing the single vertex.

46. One or more computer-readable media as recited in claim 42, wherein the step of determining whether the current triangle can be treated as a continuation of the current triangle strip comprises comparing a specific pair of triangle indices of the current triangle to a specific pair of triangle indices of the previous triangle.

47. One or more computer-readable media as recited in claim 42, wherein the step of determining whether the current triangle can be treated as a continuation of the current triangle strip further comprises:
if the previous triangle in the current triangle strip is an odd triangle and the current triangle is an even triangle, and if the second index of the previous triangle matches the first index of the current triangle and the third index of the previous triangle matches the third index of the current triangle, then adding the current triangle to the current triangle strip;
if the previous triangle in the current triangle strip is an even triangle and the current triangle is an odd triangle, and if the second index of the previous triangle matches the second index of the current triangle and the third index of the previous triangle matches the first index of the current triangle, then adding the current triangle to the current triangle strip.

48. One or more computer-readable media as recited in claim 42, wherein the step of determining whether the current triangle can be treated as a continuation of the current triangle strip further comprises:
if the previous triangle in the current triangle strip is an odd triangle and the current triangle is an even triangle, and if the second index of the previous triangle matches the second index of the current triangle and the third index of the previous triangle matches the first index of the current triangle, then adding the current triangle to the current triangle strip;
if the previous triangle in the current triangle strip is an even triangle and the current triangle is an odd triangle, and if the third index of the previous triangle matches the second index of the current triangle and the first index of the previous triangle matches the first index of the current triangle, then adding the current triangle to the current triangle strip.

49. One or more computer-readable media as recited in claim 42, wherein the step of determining whether the current triangle can be treated as a continuation of the current triangle strip further comprises:
if the previous triangle in the current triangle strip is an odd triangle and the current triangle is an even triangle, and if the second index of the previous triangle matches the third index of the current triangle and the third index of the previous triangle matches the second index of the current triangle, then adding the current triangle to the current triangle strip;
if the previous triangle in the current triangle strip is an even triangle and the current triangle is an odd triangle, and if the first index of the previous triangle matches the second index of the current triangle and the second index of the previous triangle matches the first index of the current triangle, then adding the current triangle to the current triangle strip.

50. One or more computer-readable media as recited in claim 42, wherein the step of determining whether the current triangle can be treated as a continuation of the current triangle strip further comprises:
if the previous triangle in the current triangle strip is an odd triangle and the current triangle is an even triangle, and if the third index of the previous triangle matches the first index of the current triangle and the first index of the previous triangle matches the third index of the current triangle, then adding the current triangle to the current triangle strip;
if the previous triangle in the current triangle strip is an even triangle and the current triangle is an odd triangle, and if the second index of the previous triangle matches the third index of the current triangle and the third index of the previous triangle matches the second index of the current triangle, then adding the current triangle to the current triangle strip.

51. One or more computer-readable media as recited in claim 42, wherein the step of determining whether the current triangle can be treated as a continuation of the current triangle strip further comprises:
if the previous triangle in the current triangle strip is an odd triangle and the current triangle is an even triangle, and if the third index of the previous triangle matches the second index of the current triangle and the first index of the previous triangle matches the first index of the current triangle, then adding the current triangle to the current triangle strip;
if the previous triangle in the current triangle strip is an even triangle and the current triangle is an odd triangle, and if the third index of the previous triangle matches the third index of the current triangle and the first index of the previous triangle matches the second index of the current triangle, then adding the current triangle to the current triangle strip.

52. One or more computer-readable media as recited in claim 42, wherein the step of determining whether the current triangle can be treated as a continuation of the current triangle strip further comprises:

if the previous triangle in the current triangle strip is an odd triangle and the current triangle is an even triangle, and if the third index of the previous triangle matches the third index of the current triangle and the first index of the previous triangle matches the second index of the current triangle, then adding the current triangle to the current triangle strip;

if the previous triangle in the current triangle strip is an even triangle and the current triangle is an odd triangle, and if the first index of the previous triangle matches the third index of the current triangle and the second index of the previous triangle matches the second index of the current triangle, then adding the current triangle to the current triangle strip.

53. One or more computer-readable media as recited in claim 42, wherein the step of determining whether the current triangle can be treated as a continuation of the current triangle strip further comprises:

if the previous triangle in the current triangle strip is an odd triangle and the current triangle is an even triangle, and if the first index of the previous triangle matches the first index of the current triangle and the second index of the previous triangle matches the third index of the current triangle, then adding the current triangle to the current triangle strip;

if the previous triangle in the current triangle strip is an even triangle and the current triangle is an odd triangle, and if the second index of the previous triangle matches the first index of the current triangle and the third index of the previous triangle matches the third index of the current triangle, then adding the current triangle to the current triangle strip.

54. One or more computer-readable media as recited in claim 42, wherein the step of determining whether the current triangle can be treated as a continuation of the current triangle strip further comprises:

if the previous triangle in the current triangle strip is an odd triangle and the current triangle is an even triangle, and if the first index of the previous triangle matches the second index of the current triangle and the second index of the previous triangle matches the first index of the current triangle, then adding the current triangle to the current triangle strip;

if the previous triangle in the current triangle strip is an even triangle and the current triangle is an odd triangle, and if the third index of the previous triangle matches the first index of the current triangle and the first index of the previous triangle matches the third index of the current triangle, then adding the current triangle to the current triangle strip.

55. One or more computer-readable media as recited in claim 42, wherein the step of determining whether the current triangle can be treated as a continuation of the current triangle strip further comprises:

if the previous triangle in the current triangle strip is an odd triangle and the current triangle is an even triangle, and if the first index of the previous triangle matches the third index of the current triangle and the second index of the previous triangle matches the second index of the current triangle, then adding the current triangle to the current triangle strip;

if the previous triangle in the current triangle strip is an even triangle and the current triangle is an odd triangle, and if the first index of the previous triangle matches the first index of the current triangle and the second index of the previous triangle matches the third index of the current triangle, then adding the current triangle to the current triangle strip.

56. One or more computer-readable media as recited in claim 42, further comprising communicating all triangle strips to a rendering module for display on a display device.

57. An apparatus comprising:

a communications interface configured to receive a mesh of triangles represented by a triangle list;

a triangle processing module coupled to the communications interface, wherein the triangle processing module is configured to determine whether a current triangle can be treated as a continuation of an current triangle strip by comparing a specific pair of triangle indices of the current triangle to a specific pair of triangle indices of the previous triangle, wherein the triangle processing module adds a single vertex to the current triangle strip if the current triangle can be treated as a continuation of the current triangle strip, and wherein the triangle processing module terminates the current triangle strip if the current triangle cannot be treated as a continuation of the current triangle strip.

58. An apparatus as recited in claim 57 wherein the single vertex added to the current triangle strip is the vertex of the current triangle that is not already contained in the current triangle strip.

59. An apparatus as recited in claim 57 wherein terminating the current triangle strip includes creating a new triangle strip starting with the current triangle and processing all three vertices associated with the current triangle.

60. An apparatus as recited in claim 57 wherein determining whether the current triangle can be treated as a continuation of the current triangle strip includes:

if the previous triangle in the current triangle strip is an odd triangle and the current triangle is an even triangle, and if the second index of the previous triangle matches the first index of the current triangle and the third index of the previous triangle matches the third index of the current triangle, then adding the current triangle to the current triangle strip;

if the previous triangle in the current triangle strip is an even triangle and the current triangle is an odd triangle, and if the second index of the previous triangle matches the second index of the current triangle and the third index of the previous triangle matches the first index of the current triangle, then adding the current triangle to the current triangle strip.

61. An apparatus as recited in claim 57 wherein the triangle processing module is further configured to communicate all triangle strips to a rendering module coupled to the triangle processing module.

62. A method of optimizing a triangle mesh represented by a triangle list, the method comprising:

rearranging the triangles such that triangle indices for adjacent triangles are stored as sequential entries in the triangle list; and     rotating the orientation of the triangle indices, if necessary, to facilitate processing of the mesh of triangles.

63. A method as recited in claim 62, wherein the triangle mesh represent at least one three-dimensional object.

64. A method as recited in claim 62, further comprising:

providing the optimized triangle list to a triangle processing module for converting the optimized triangle list into at least one triangle strip.

65. A storage medium comprising:
- a plurality of triangles represented in a triangle list, wherein the plurality of triangles represent image data;
- individual triangles each arranged to form a triangle strip; and
- the triangle indices of each individual triangle rotated, if necessary, to facilitate processing of the triangle list.

66. A storage medium as recited in claim 65, wherein the plurality of triangles represents a three-dimensional image.

67. A storage medium as recited in claim 65, wherein the storage medium is a video game cartridge.

68. A storage medium as recited in claim 65, wherein the storage medium is a computer-readable storage medium.

* * * * *

UNITED STATES PATENT AND TRADEMARK OFFICE
CERTIFICATE OF CORRECTION

PATENT NO.   : 6,496,185 B1
DATED          : December 17, 2002
INVENTOR(S) : Keam It is certified that error appears in the above-identified patent and that said Letters Patent is hereby corrected as shown below:

<u>Title page,</u>
Item [57], ABSTRACT,
Line 15, insert -- is -- between "strip" and "terminated.".

Signed and Sealed this

Thirteenth Day of May, 2003

JAMES E. ROGAN
*Director of the United States Patent and Trademark Office*